(No Model.)
H. C. SHUBERT.
AMMETER OR VOLTMETER.
No. 449,766. Patented Apr. 7, 1891.
Fig. 1.
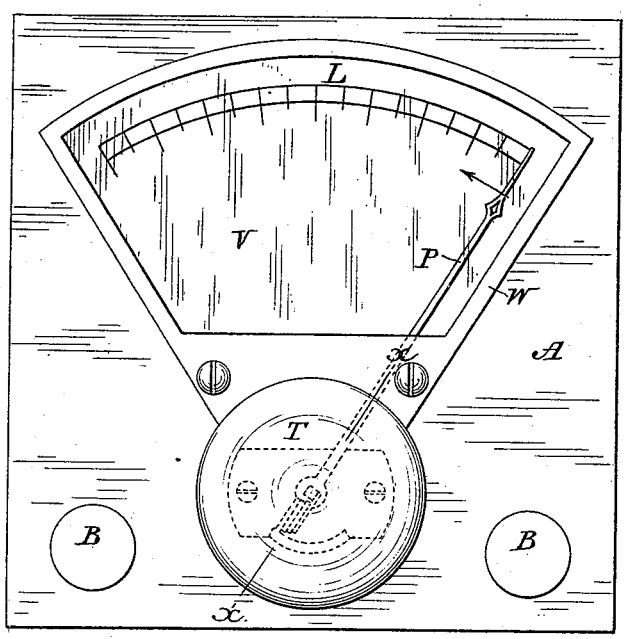
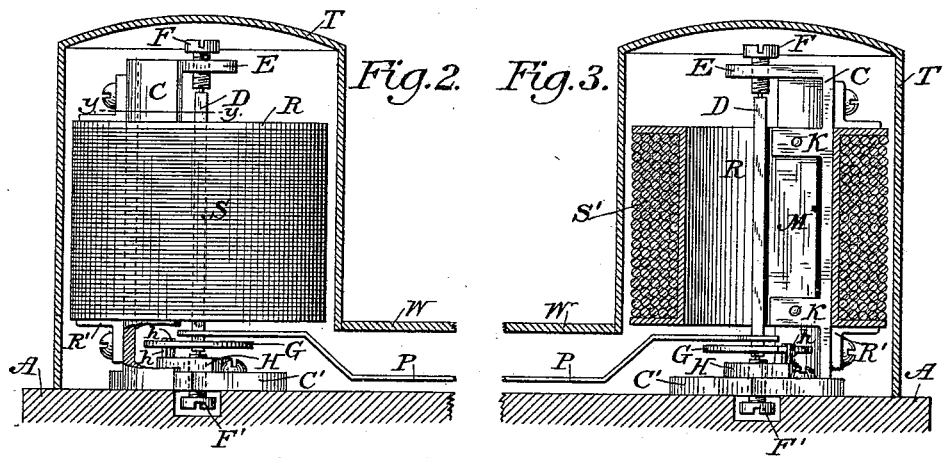
Fig. 2. Fig. 3.
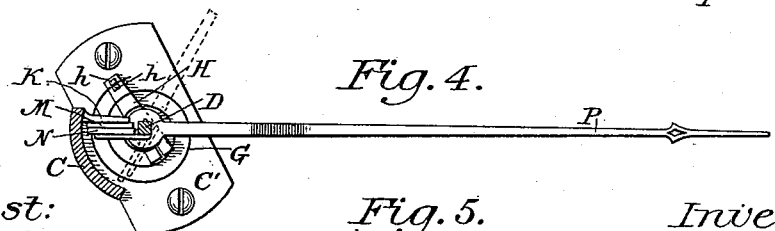
Fig. 4.
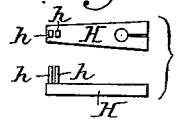
Fig. 5.
Attest:
A. N. Jesbera
E. M. Watson
Inventor:
Harold C. Shubert
By David A. Bower
Atty.

UNITED STATES PATENT OFFICE.

HAROLD C. SHUBERT, OF CHICAGO, ILLINOIS, ASSIGNOR OF ONE-THIRD TO WARREN B. MARTINDALE, OF KENOSHA, WISCONSIN.

AMMETER OR VOLTMETER.

SPECIFICATION forming part of Letters Patent No. 449,766, dated April 7, 1891.

Application filed October 31, 1890. Serial No. 370,004. (No model.)

*To all whom it may concern:*

Be it known that I, HAROLD C. SHUBERT, of Chicago, in the county of Cook and State of Illinois, have invented new and useful Improvements in Electric Ammeters and Voltmeters; and I do hereby declare that the following is a full and exact description thereof, reference being had to the accompanying drawings, and to the letters of reference marked thereon, making a part of this specification.

My invention relates to instruments for measuring strong electric currents or electromotive force, and has for its object to produce at low cost a compact simple ammeter or voltmeter which shall be reliable and accurate under all conditions, and which will admit of being placed in any position without interfering with its effective operation.

It consists, substantially as is hereinafter described and claimed, in the combination, with two opposed soft-iron plates inclosed within an encircling coil included in the electric circuit, one of which is fixed and the other secured to a spindle carrying an indicating-pointer, of a coiled spring governing the spindle and a regulating-lever controlling the spring for its adjustment, the spring operating when adjusted to produce a contact of the soft-iron plates, so that the repulsion of the plates when magnetized by a current in the coil may be measured by the tension of the spring to indicate the amount or force of said current.

In the accompanying drawings, Figure 1 is a plan view of my improved ammeter or voltmeter; Fig. 2, a vertical section thereof on enlarged scale in line $x\ x$ of Fig. 1, looking to the left; Fig. 3, a similar section in the same plane looking to the right; Fig. 4, a sectional detail in line $y\ y$, Fig. 2, of the index-pointer and its attachments; and Fig. 5, details of the regulating-lever for the spring governing the index-spindle.

A represents a simple base-board, upon which my instrument is mounted, and B B the binding-screws thereon, by which the instrument is connected with the wires of an electrical circuit. Upon the base A is mounted a standard C, having a foot-plate C', by means of which it is supported upon and made fast to the base. The standard C is curved in cross-section (see Fig. 4) upon an arc having a vertical spindle D as its center, said spindle being mounted to oscillate freely in pivotal bearings provided therefor in the foot-plate C' and in a parallel arm E, projecting from the upper end of the standard. By preference the ends of the spindle are pivoted upon the hardened points of pivot-screws F F', fitted to work, respectively, downward through the end of the arm E and upward through the foot-plate C'. These delicate pivots serve to reduce the friction to a minimum and permit the utmost delicacy of action in the oscillation of the spindle.

A finely-tempered coiled spring G, made to encircle the lower end of the spindle D, is attached at its inner end to the spindle and is caught at its outer end between two pins $h\ h$ upon the outer end of the lever H, which is fitted to turn at its inner end upon the lower pivot-screw F' as its axis. The end of this regulating-lever H is split, as shown in Fig. 5, so that it may be made to clamp the screw with sufficient force to prevent a free movement of the lever thereon and yet allow it to be turned for the purpose of adjusting the tension of the spring upon the spindle.

A plate M, of soft iron, is secured vertically against two radial arms K K, projecting inward from one edge of the standard C, and a corresponding plate of soft iron N is secured longitudinally by its inner edge to the spindle D parallel with the plate M, (see Fig. 4,) so that in the oscillation of the spindle these two parallel plates may be brought more or less closely into contact face to face, as shown in Fig. 4, and the spring G is so adjusted as to produce this contact automatically.

An indicating-pointer P is fitted to the spindle D to extend thence horizontally over a suitable scale L marked upon the base-board A, as shown in Fig. 1. This pointer serves to indicate the degree of stress upon the spring G produced during the movement of the pointer from the initial point, which it covers when the plates M N are in contact, said movement being produced by the rotation of the spindle D as the plate N, which it carries, is repelled by and forced away from the opposite plate M, fixed upon the standard C.

A bobbin or cylindrical standard R is mounted to encircle concentrically the spindle D and embrace within it the standard C, and it is supported upon said standard by means of a bracket R'. This bobbin is of such height or length as to fully cover the soft-iron plates M N, and where the indicator is designed for measuring electro-motive force a fine wire S is coiled around the bobbin, as shown in Fig. 2, and connected at its ends to the binding-screws B B; but where the instrument is designed to measure strong electric currents the bobbin is wound, as shown in Fig. 3, with a coil or coils of heavy wire S', whose ends are connected with the binding-screws B B.

The apparatus is covered and protected by a suitable case T, having a segmental frame W projecting from it over the base-board A to extend beyond and completely inclose, as shown in Fig. 1, both the indicator P and the scale L, over which it moves, the open top of the frame being covered with a plate of glass V.

I claim as my invention—

1. The combination, in a device for indicating the force of electric currents, with a fixed soft-iron plate, an opposite movable soft-iron plate, a rotative spindle carrying said movable plate to swing to and from the fixed plate, an indicator carried by the movable plate, and a coil encircling the two plates and adapted to be included in an electrical circuit, of a coiled spring attached to the rotative spindle and operating automatically to carry the movable plate toward the fixed plate, and a regulating-lever governing the spring to determine its tension, substantially in the manner and for the purpose herein set forth.

2. The combination, in a device for indicating the force of electric currents, of the base-plate A, having a scale L marked thereon, the vertical standard C, secured to said base, the foot-plate C' and horizontal arm E, attached to said standard, the spindle D, rotating freely in bearings in said foot-plate and arm, the soft-iron plate M, projecting from the standard toward the spindle, the corresponding soft-iron plate N, projecting radially from the spindle opposite the plate M, the pointer attached to the spindle to oscillate over the scale L, the coil S, encircling the standard and spindle, the pivoted regulating-lever H, and the coiled spring G, encircling the spindle D and attached at one end to the spindle and at the other to said lever, substantially in the manner and for the purpose herein set forth.

In testimony whereof I affix my signature in the presence of two subscribing witnesses.

H. C. SHUBERT.

Witnesses:
L. K. CURLETT,
W. J. JULESON.